Patented Dec. 15, 1925.

1,566,009

UNITED STATES PATENT OFFICE.

CARL G. HINRICHS, OF ST. LOUIS, MISSOURI.

PROCESS OF TREATING PETROLEUM.

No Drawing.    Application filed November 3, 1923.    Serial No. 672,680.

*To all whom it may concern:*

Be it known that I, CARL G. HINRICHS, a citizen of the United States, residing at St. Louis, Missouri, have invented a certain new and useful Improvement in Processes of Treating Petroleum, of which the following is a full, clear, and exact description, such as will enable others skilled in the art to which it appertains to make and use the same.

My invention relates to the treatment of crude petroleum and this application consists in some respects in improvements on the treatment described and claimed in my copending application Serial No. 263,806. As is well known to those familiar with the art, much of the crude petroleum produced contains a quantity of foreign matter which is objectionable, not only to the users of the petroleum, but to the pipe lines which carry the petroleum to the refineries. In many cases the pipe lines will not even receive crude petroleum containing an excess of certain foreign substances.

Even where the crude petroleum as it comes from the ground is in satisfactory condition for transportation, when it is stored for a substantial period before shipment, as is often the case, a quantity of foreign accumulations settle to the bottom of the tanks in the form of a thick and viscous mass which is commonly called bottom settlings. In so settling a substantial amount of good petroleum is carried down and forms a part of the bottom settlings, the mass apparently constituting an emulsion of a colloidal nature and the same characteristic emulsion exists to a less pronounced degree in the objectionable roily oils forming the natural product first referred to above.

These bottom settlings are a source of annoyance and expense even though no attempt is made to reclaim the petroleum contained in them as they must be stored or otherwise disposed of.

Many of the emulsions contain water and a quantity of mineral salts such as sodium chloride, magnesium chloride, or calcium chloride, in the form of brines. The emulsions also contain iron salts.

The object of my invention is to separate the oil in these emulsions from the foreign matter. Various treatments of roily oils and bottom settlings have been proposed and used and some of them are successful in certain fields but unsuccessful in other fields. In other words, the nature of the roily oils or bottom settlings varies in different fields and treatments which are effective with one emulsion are ineffective with others.

It has been known that treating these emulsions with sulphuric acid will free the petroleum but such treatment is impractical as the pipe lines will not accept oils containing any sulphuric acid for the simple reason that it attacks and destroys the pipes.

By the use of salts of sulphuric acid compounds, however, this objection is eliminated and the emulsions satisfactorily treated. With certain emulsions, especially those which contain iron salts, ammonium, calcium, or potassium salts of sulpho-cyanic acid are particularly effective. These salts have the following formula, respectively: $NH_4CNS$, $Ca(CNS)_2$, $KCNS$. These may be applied either in acid, alkaline, or neutral solutions. An acid solution is generally more effective and for the purpose of rendering the solution acid, I have successfully used phosphoric and hydrochloric acids.

Each of these sulpho-cyanides are effective and form sulpho-cyanides of iron which are soluble in the oil or in the foreign matter where the latter is substantially liquid. This solubility of iron salts in combination with the effect of the sulpho-cyanide upon the emulsion gives a highly desirable clean break between the oil and the foreign matter.

The sulpho-cyanides may be applied to the emulsion as a powder or in solution and may be applied to a cold emulsion or the same may be heated during the treatment.

In my above mentioned copending application an apparatus is described which is very effective in applying the sulpho cyanides in solution but it will be understood that neither this apparatus or any other special equipment is essential to the successful operation of the process described by me which consists essentially in the use of sulpho-cyanides in treating the roily oil or bottom settlings emulsions.

I claim:

1. The method of treating an aqueous emulsion in hydrocarbon oil which includes the mixing of a water soluble sulpho-cyanide therewith.

2. The method of treating an aqueous emulsion in hydrocarbon oil containing mineral salts which consist in mixing a salt of sulpho-cyanic acid therewith and permitting the mixture to stand.

3. The method of treating an aqueous emulsion in hydrocarbon oil containing iron salts which consists in forming an iron compound soluble in the fluids comprising the emulsion, by the addition of a sulpho-cyanide to the emulsions.

4. The method of treating an aqueous emulsion in hydrocarbon oil containing iron salts which consists in forming an iron compound soluble in the fluids comprising the emulsion, by the addition of sulpho-cyanide of potassium.

5. The method of treating an aqueous emulsion in hydrocarbon oil which includes the mixing of sulpho-cyanide of potassium therewith.

6. The method of treating an aqueous emulsion in hydrocarbon oil which includes the mixing therewith of a solution of a sulpho-cyanide rendered acid with phosphoric acid.

7. The method of treating an aqueous emulsion in hydrocarbon oil to separate the petroleum from foreign matter which consists in the mixing therewith of potassium sulpho-cyanide rendered acid with phosphoric acid.

In testimony whereof I hereunto affix my signature this 1st day of November, 1923.

CARL G. HINRICHS.